US008850400B2

(12) United States Patent
Shrivastava et al.

(10) Patent No.: US 8,850,400 B2
(45) Date of Patent: Sep. 30, 2014

(54) SYSTEM AND METHOD FOR PROVIDING AN IMPLEMENTATION ACCELERATOR AND REGRESSION TESTING FRAMEWORK FOR USE WITH ENVIRONMENTS SUCH AS FUSION APPLICATIONS

(71) Applicant: Oracle International Corporation, Redwood Shores, CA (US)

(72) Inventors: Anish Shrivastava, New Delhi (IN); Ramesh Nagaraju, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 13/626,710

(22) Filed: Sep. 25, 2012

(65) Prior Publication Data

US 2014/0089900 A1  Mar. 27, 2014

(51) Int. Cl.
*G06F 9/44* (2006.01)
*G06F 9/445* (2006.01)
*G06F 11/34* (2006.01)
*G06F 11/36* (2006.01)

(52) U.S. Cl.
CPC ........ *G06F 9/44589* (2013.01); *G06F 11/3466* (2013.01); *G06F 11/3664* (2013.01)
USPC ............................. 717/126; 717/127; 717/128

(58) Field of Classification Search
CPC ................ G06F 9/44589; G06F 11/3664; G06F 11/3466
USPC .......................................... 717/126, 127, 128
See application file for complete search history.

(56) References Cited

U.S. PATENT DOCUMENTS

| 6,601,018 | B1 | 7/2003 | Logan |
| 6,907,546 | B1 | 6/2005 | Haswell et al. |
| 7,366,955 | B2 | 4/2008 | Kuturiann et al. |
| 7,721,265 | B1 * | 5/2010 | Xu et al. ........................ 717/127 |
| 7,895,565 | B1 | 2/2011 | Hudgons et al. |
| 2002/0161700 | A1 | 10/2002 | Ernst et al. |
| 2007/0022323 | A1 | 1/2007 | Loh et al. |
| 2007/0234293 | A1 | 10/2007 | Noller et al. |
| 2013/0159963 | A1 * | 6/2013 | Dhalait ........................ 717/104 |

OTHER PUBLICATIONS

Mittal et al., "An Open Framework for Managed Regression testing", 2003.*
Haftmann, F. et al., A Framework for efficient regression tests on database applications, The VLDB Journal 2007, vol. 16, pp. 145-164, Sep. 13, 2006.
Haftmann, F. et al., Parallel Execution of Test Runs for Database Application Systems, Proceedings of the 31st VLDB Conference, Trondheim, Norway, 2005, pp. 589-600.

* cited by examiner

Primary Examiner — Phillip H Nguyen
(74) Attorney, Agent, or Firm — Meyer IP Law Group

(57) ABSTRACT

A system and method for providing a regression testing framework for use with enterprise applications, such as Oracle Fusion Applications and Fusion Financials, by rapidly implementing applications according to a customized configuration, and subsequently performing regression tests on an implemented application instance. In accordance with an embodiment, the system comprises a plurality of automated, e.g., Fusion Financials application setups; automation services which can be consumed by setups and regression tests as per requirement; multiple automated regression tests which can be executed by the regression testing framework, to test an implemented instance of the applications; and a central execution controller, which controls the runtime behavior of application setups and regression tests that subscribe to it.

15 Claims, 6 Drawing Sheets

US 8,850,400 B2

SYSTEM AND METHOD FOR PROVIDING AN IMPLEMENTATION ACCELERATOR AND REGRESSION TESTING FRAMEWORK FOR USE WITH ENVIRONMENTS SUCH AS FUSION APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to enterprise applications, such as Oracle Fusion Applications and Fusion Financials, and is particularly related to a system and method for providing a regression testing framework, including developing an implementation accelerator and conducting regression tests on an implemented instance through an automated approach.

BACKGROUND

Today's organizations rely increasingly on enterprise resource planning (ERP) software or enterprise applications, which provide functionality such as, customer relationship management (CRM), business intelligence (BI), and financials (FIN).

One example of a modern enterprise application environment is Oracle Fusion Applications, which combines all of the functionality a large organization might need, within a modular standards-based environment. Within a Fusion Applications environment, enterprise applications such as Fusion Financials can be used to provide a complete financial management solution, including capabilities such as general ledger, accounts payable, accounts receivable, fixed assets, cash management, expense, and collections management.

Ensuring that such environments and applications will perform accurately and as intended is an important aspect of software development and testing. This is the general area that embodiments of the invention are intended to address.

SUMMARY

Described herein is a system and method for providing a regression testing framework for use with enterprise applications, such as Oracle Fusion Applications and Fusion Financials, by rapidly implementing applications according to a customized configuration, and subsequently performing regression tests on an implemented application instance. In accordance with an embodiment, the system comprises a plurality of automated, e.g., Fusion Financials application setups; automation services which can be consumed by setups and regression tests as per requirement; multiple automated regression tests which can be executed by the regression testing framework, to test an implemented instance of the applications; and a central execution controller, which controls the runtime behavior of application setups and regression tests that subscribe to it. The regression testing framework can be generally used to test the operations of an enterprise application in the context of a quality assurance or quality control setting, prior to the application instance being moved to production use within a particular organization.

DETAILED DESCRIPTION

As described above, today's organizations rely increasingly on Enterprise Resource Planning (ERP) software or enterprise applications. Generally, these are organization-wide software application environments such as Oracle Fusion Applications and Fusion Financials applications, which provide functionality such as customer relationship management (CRM), business intelligence (BI) and financials (FIN). Ensuring that such environments are implemented rapidly at minimum cost, and will subsequently perform accurately and as intended, is an important aspect of software development and testing.

To address this, in accordance with an embodiment, described herein is a system and method for providing an implementation accelerator and regression testing framework for use with enterprise applications, particularly Fusion Financials applications, which can be generally used to quickly implement multiple instances of Fusion Financials applications and/or other enterprise applications, and subsequently test the implemented solution for intended functionality in the context of a Quality Assurance or Quality Control setting, prior to deployment of the application instance in a production environment within a particular organization.

Generally, enterprise application implementation is a carefully orchestrated and labor-intensive task. Implementing an instance of an enterprise application requires synchronized coordination between various functional modules of the application suite. It also requires extensive amounts of data to be entered in each functional module at an appropriate time, so that larger organizational components can take shape within the system accordingly.

In accordance with an embodiment, the implementation accelerator handles this scenario in a two-pronged approach. First, the sequences and responses to current application environment conditions with respect to various implementation tasks are governed pragmatically though an automation framework and its associated services, which greatly enhances the credibility of the process. Also, the labor-intensive tasks such as data entry are automated, resulting in improved efficiency. Then, post-implementation, the application instance is subjected to multiple regression tests to ensure it functions as per design. This is handled by the automated regression testing framework. The designed automation framework handles simultaneous implementation and regression testing on multiple different application instances and application versions, which provides additional benefits that improve overall process efficiency.

Figure 1:
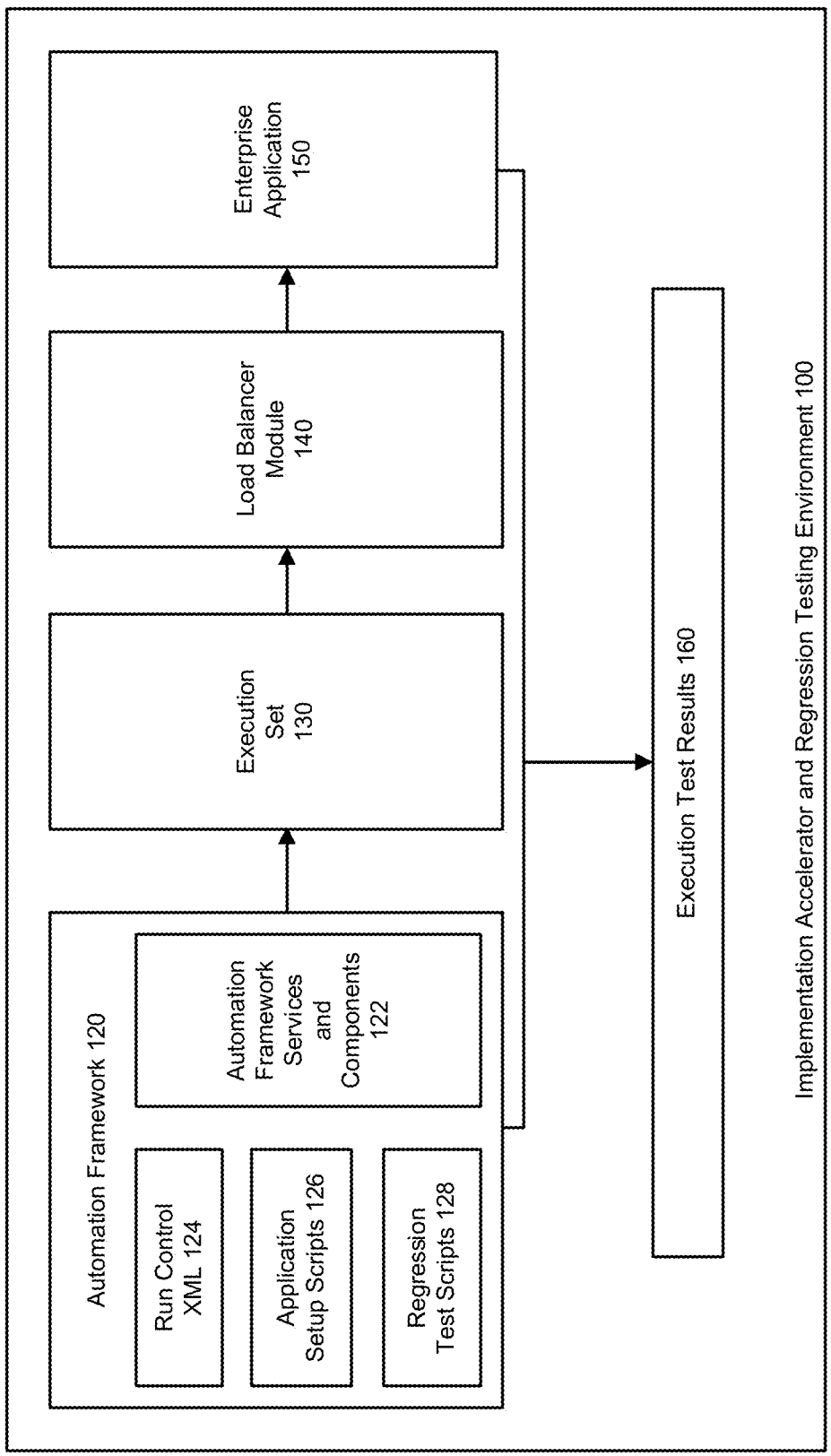
FIG. 1 illustrates the high level organization of an implementation accelerator and regression testing framework for use with enterprise applications such as Fusion Financials, in accordance with an embodiment.

FIG. 1 illustrates a high level organization of an implementation accelerator and regression testing framework for use with enterprise applications such as Fusion Financials, in accordance with an embodiment. As shown in FIG. 1, in accordance with an embodiment, the implementation accelerator and regression testing framework 100 comprises an automation framework 120 that executes the scripted Fusion Financials application setup 126, and regression testing 128 scripts which conform to its standards. It does this on the basis of parameters provided by a Run Control Extensible Markup Language (XML) 124, and various automation framework services and components 122 that constitute the automation framework. The scripts to be executed for a particular run may be grouped together in an Execution Set component 130 for tracking purposes. These are submitted for execution to the automation execution tool by a load balancer module 140, which determines the load on each of the available hosts running the automated script execution tool, and accordingly submits execution scripts to be executed 150, determined with reference to the execution set for the particular run. The automation framework manages the execution of the script, determines its execution result, and updates the execution set accordingly.

Table 1 illustrates some of the characteristics and limitations of this type of approach.

TABLE 1

| Testing Phase | Characteristics | Limitations of Approach |
|---|---|---|
| Automated Regression Script Design | No distinction between regression tests according to testing needs. | Automation script designer must approach each script individually and design it according to their interpretation, which causes synchronization issues between dependent scripts especially related to application setups and hence may result in repetitive efforts by automation script designer. |
| | Focused on the execution aspect of regression testing of automated tests. | Focus on execution aspect makes it difficult to obtain a precise estimate of work and time for any automation script development activity. |
| Automated Regression Script Development | No standard approach for writing the script code. | Non-standard approaches to automation, leads to inconsistent performance and erratic results in terms of implemented enterprise application solution. |
| | No central mechanism to handle exceptions and capture screen shots. | Scripts are vulnerable to the developer's understanding of the product functionality and ability to place check points at all critical events. |
| | Limited ability to accommodate reusable components. | Repetition of code for common tasks adds to development time and maintenance of code. |
| Automated Regression Script Execution | Execution of automation script dependent on the order in which tests are submitted for execution. | Automation scripts are executed irrespective of the current environment conditions, causing needless execution infrastructure resource utilization, and slowing down script execution. |
| | Script is the unit focus, and every other aspect of the regression testing framework is centric to the script. | Modifications are required at the script level in case of any changes in the testing conditions or enterprise application business processes. |
| | No exception handling mechanism. | Unnecessary utilization of system resources for execution until the end of script, even though the test might have failed in mid-test. |
| | Not capable of intelligently deciding which scripts to run on the basis of system inputs. | Significantly higher cost since automation engineers are required to constantly monitor the progress and triage huge amount of data in case of failures. They may also need to refer to functional counterparts for verifying feasibility of automation in case of partial run. Such method may also cause huge load on the system resources due to exceptionally high failed results in case of dependent scripts or may result in flawed system configuration causing rework for the entire application implementation process. |

To address the above limitations, in accordance with an embodiment, a system and method is described for providing an automated application implementation and regression testing framework for use with enterprise applications, which is generally based on principles of scalability and maintainability, both of the framework itself, and of the automated regression scripts designed and used therewith.

In accordance with an embodiment, the regression testing automation framework provides a well-organized platform for implementation of Fusion Financials applications, and subsequent execution of regression tests to validate the implemented application instance. Some of the advantages of this approach include the ability to rapidly add new automation framework services which can be utilized by all scripts that subscribe to it. Changes are required only at the framework level, leaving scripts more or less untouched, thereby greatly reducing maintenance effort. Application setup scripts can be quickly reconfigured to facilitate any changes in the business process or changes in implementation requirements. New application instances can be created on the fly with little or no modification to associated data. A modular architecture ensures reusability of code and enhanced efficiency in terms of efficiency in maintenance and script development activities. The approach also ensures consistently utilizing the best practices to accomplish a particular task resulting in more predictable execution. Synchronization between various dependent tasks is maintained and monitored by the automation framework, ensuring that all prerequisites are in place before a task is submitted. The automation framework responds to application events and conditions programmatically, which allows automated functioning of the entire implementation and regression testing process. Common login information can be provided though easily modifiable XML data sheets, allowing ease of use and simultaneous implementation and testing of multiple different application instance. This is especially beneficial in a dynamic software development and testing environment.

Figure 2:
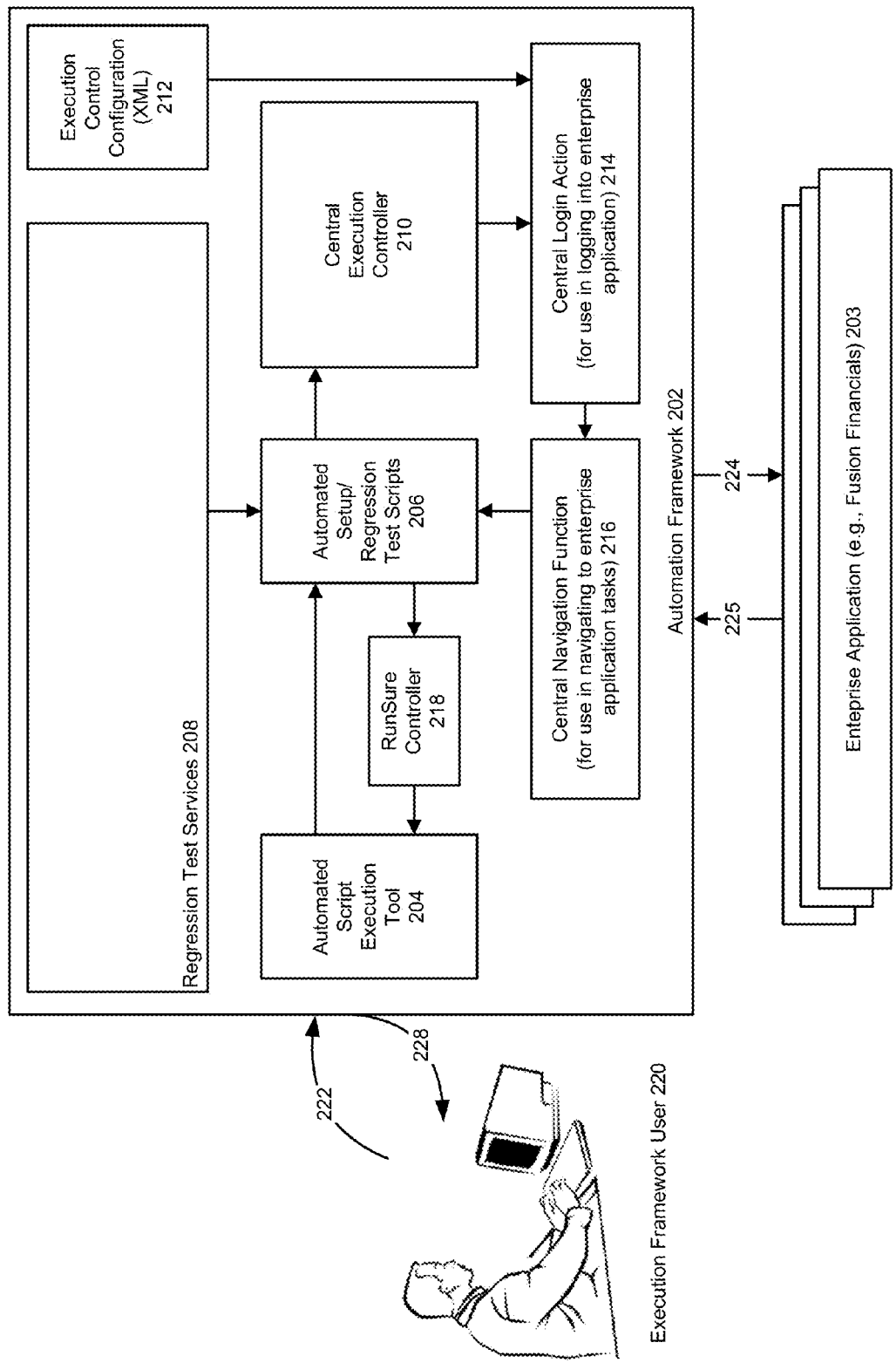
FIG. 2 illustrates the components of an automation framework for use with enterprise applications, in accordance with an embodiment.

FIG. 2 illustrates a system for developing a Fusion Financials application implementation accelerator and regression testing framework for use with enterprise applications, such as Oracle Fusion Applications and Fusion Financials, in accordance with an embodiment.

As shown in FIG. 2, in accordance with an embodiment, the framework 202 can be hosted on a centralized server and can provide its services to multiple hosts running automated scripts conforming to its standards, and can comprise:

Automation Script Execution Tool 204: In accordance with an embodiment, the automation script execution tool allows an automation engineer to develop, execute and maintain automated scripts for use with the automation framework and one or more enterprise applications.

Automated Setup/Regression test scripts 206: In accordance with an embodiment, automated setup/regression test scripts are script components that can be executed by the automation tool and subscribe to the standards of the automation framework, thereby being able to consume framework services and be integrated with framework components. This allows the scripts to efficiently implement Fusion Financials applications and subsequently test the implemented instance. In accordance with an embodiment, the decision to consume services can be based either on central execution controller settings, or at the script level, with script level settings generally taking precedence.

Regression Test Services 208: In accordance with an embodiment, regression test services can include services such as a central common function library, central exception handler, application instance and automated script specific external object repository, and application instance and automated script specific external data sheet", (each of which are described in further detail below), which can be consumed by an automated regression script during implementation and testing of an enterprise application.

Central Execution Controller 210: In accordance with an embodiment, the central execution controller component is a logic that controls the testing process, deciding what needs to be done and when, including determining critical execution controls and hosting services based on a set scenario for execution. Test-related parameters can be passed, e.g., as an execution control configuration XML input, to the central execution controller.

Execution Control Configuration (e.g., XML) 212: In accordance with an embodiment, the execution control configuration can be provided as an XML or similar configuration component that determines parameters to be used for the execution of scripts. In accordance with an embodiment, example configuration parameters include: Static Wait Value (to determine seconds for which each script should wait in places where static wait is defined in the regression script; this is especially useful when the application environment has an elevated response time due to performance issues); Dynamic Wait Value (to determine the maximum wait period for which the regression test waits for the page or control to render; Tenant Identifier (to specify if the particular environment is a tenant-enabled environment and if so the particular tenant name to be used); and Login Type (to determine the login type to be used based on which the central login action is executed).

An exemplary set of login variables are shown in Table 2. These, together with the above described configuration parameters, are provided by way of illustration; in accordance with other embodiments, other types of configuration parameters and login variables can be used.

TABLE 2

| Login Variable | Description |
| --- | --- |
| ATK login | Login directly to the central ATK page |
| Direct login | Login directly to the required page |
| Index login | Login based on links specified on the index page. |
| Browsing Type | Used to specify the browsing types which have been classified as shown below |
| Normal | For cases where no special browsing needs exist |
| Inprivate | Launch an "InPrivate" browsing session such that cookies and session information is not maintained in the browser |
| Session | Used to determine if the Single Sign On Page is available or not for the particular execution |
| Re Run Variable | Re Run variable to be used for execution of the setup based scripts. |
| Host Name and Port Number | To be used in case of direct login method in combination with the URI for the particular task. |
| Homepage URLs | To be used in case of ATK login |
| Database Credentials | Database connection string and login credentials to be used in case of scripts that need to write directly into the data base |

Central Login Action 214: In accordance with an embodiment, the central login action component handles logins, e.g., to different product families or different components of the Fusion Financials applications family. This allows reuse of the login code at individual script level, greatly improving maintenance and process efficiency with respect to Fusion Financials application login. It further allows the system to cater to multiple product families, components and types of login within the application. For example, in accordance with an embodiment, the central login action component can handle login requirements depending on the specified login type for any of the products within the Fusion Financials family of applications.

Central Navigation Function 216: In accordance with an embodiment, the central navigation action component provides automatic navigation to an enterprise application task component. For example, in accordance with an embodiment, the central navigation function can navigate to a particular task in the "Functional Setup Manager" module of the Fusion Applications product family. In accordance with an embodiment, this can be done on the basis of navigation provided as input, following which the action automatically determines the hierarchy, and navigates and launches the particular task automatically.

RunSure Controller 218: In accordance with an embodiment, the RunSure controller component is designed to be used particularly with Fusion Applications setup based scripts. This component ensures that application setup and related data entry is completed as per specification. In the event of a script stopping due to unforeseen circumstances, runtime data might be lost, resulting in time extensive rework of the application implementation process. In accordance with an embodiment, the RunSure Controller component tracks progress made with respect to each successful setup data iteration for each script in each application instance in a dedicated database, and then refers to this database to determine a likely data iteration to resume further automation progress. This ability to determine a particular point for a particular script in a particular instance, up to the point to which the script has executed, successfully allows automation execution to be restarted from that point only rather than from scratch. In accordance with an embodiment, rerun specific information can be maintained in the RunSure database, which is referred to before each setup data iteration.

As further shown in FIG. 2, during implementation and testing of an enterprise application (e.g., Fusion Financials) 203, the automation framework user 220 can use 222 the automation framework for implementation and regression testing of Fusion Financials applications. Automation execution tool is used to create modify and execute one or more automated scripts depending on the implementation and testing scenario utilizing services and component offered by the automation framework. Execution is performed 224, 225 against the Fusion Financials applications and results are captured and reported 228 back to the user.

Figure 3:
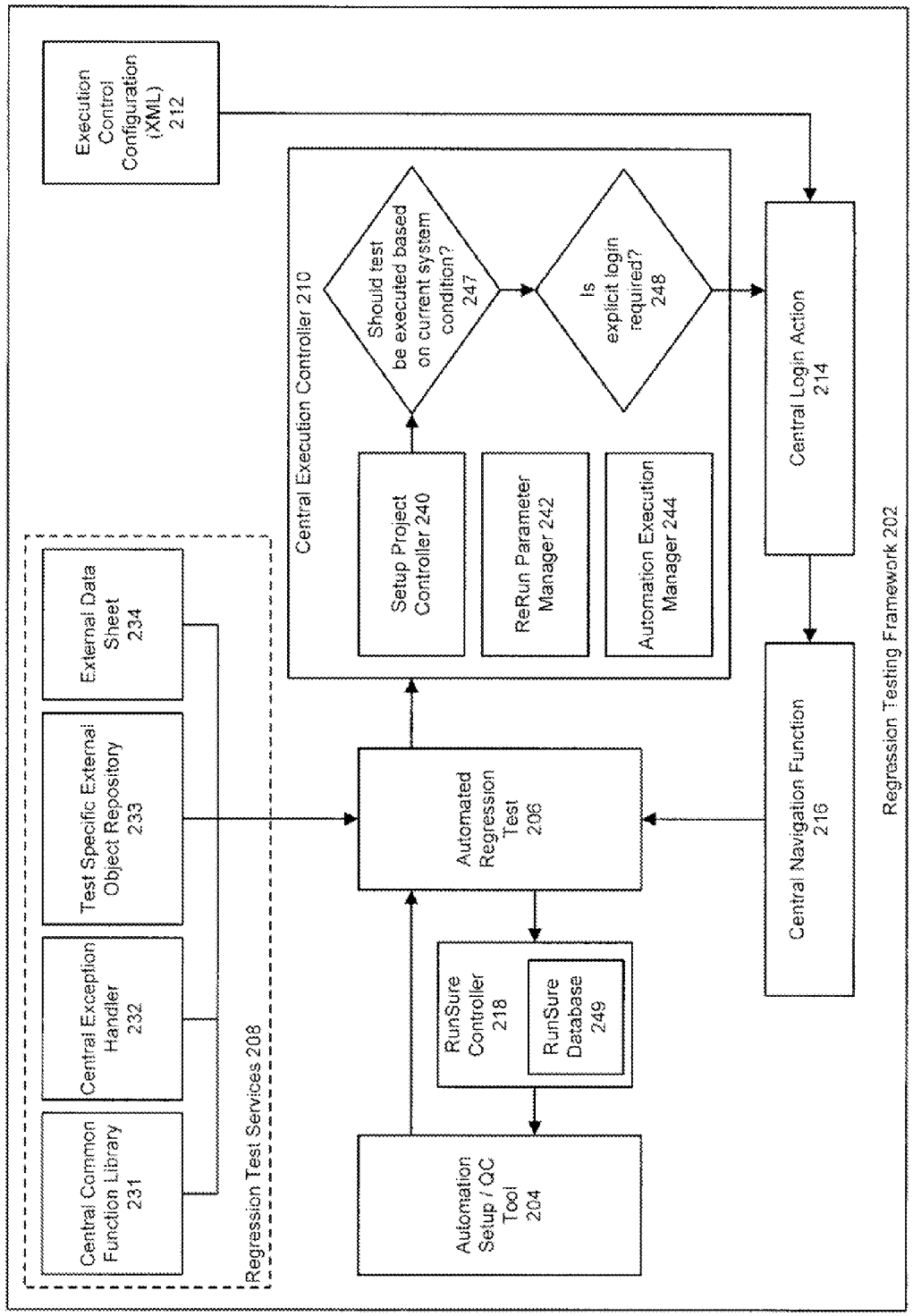
FIG. 3 further illustrates the components of an automation framework for use with enterprise applications, in accordance with an embodiment.

FIG. 3 further illustrates a system for building Fusion Financials Implementation and testing accelerator for use with enterprise applications, in accordance with an embodiment. As shown in FIG. 3, in accordance with an embodiment, examples of the regression test services that can be consumed by automated regression scripts during implementation and subsequent testing of an enterprise application include:

Central Common Function Library 231: In accordance with an embodiment, the central common function library can be provided as a Visual Basic or similarly coded file, or another form of library that includes functions that can be referenced by script code. In accordance with an embodiment, the central common function library can include custom written functions that can be consumed by automation scripts with which this library is associated. This provides developers with a keyword-driven script development, ensures readability of code in script form by reducing the number of lines of code, and allows for ease of maintenance by allowing the code to be changed centrally, instead of in every script.

Central Exception Handler 232: In accordance with an embodiment, the central exception handler is primarily tasked with programmatically monitoring automated scripts while they are executing on the Fusion Financials applications. The primary purpose of doing so is to ensure that immediate or necessary corrective action is taken as per programmed instructions in the event of an error or unexpected behavior. For example, if the script encounters an unhandled error while it is executing on the application, the exception handler is triggered which may capture the current system conditions including a screenshot of the system and immediately stop further execution of the script. This immediate response not only helps identify a root cause of the issue in case of dependent setups, but it also allows system resources to be free of clutter by inhibiting further progress in case of failed scenario.

Application Instance and Automated Script Specific External Object Repository 233:—In accordance with the embodiment, the external object repository is tasked with identifying specific objects on, e.g., the application screen, and various operations that can be performed on them by the script to accomplish the particular task. The automation framework ensures that the object repository is paired with the script at runtime, and hence enables the same automation script to run on multiple application versions. This is so because different application versions are expected to have different definitions for various systems objects. For example a first version of an application, may represent a particular system object with a different set of properties as compared to a second version. The same script can perform on both versions of the application simultaneously by pairing the appropriate external object definition at runtime.

Application Instance and Automated Script Specific External Data Sheet 234: In accordance with an embodiment, the external data sheet provides the separation of data from the script. This ensures that the same script can be simultaneously used to setup and test with different application instances with different organizational data. For example, a first version can be used to setup a first instance of the enterprise application, with a first set of data, while a second version can be used to setup a second instance of the enterprise application, with a second set of data.

As further shown in FIG. 3, in accordance with an embodiment, the central execution controller can include:

Oracle Fusion Financials Implementation Project Controller 240: In accordance with an embodiment, this is a key functionality particular to the Fusion Financials Functional Setup Manager. In accordance with an embodiment, the setup project controller acts as a control to determine and maintain the Fusion Functional Setup Manager setup project identification number. This is subsequently used by other application setup tasks for carrying out setups within the enterprise application (for example, a setup project can be created in the Fusion Functional Setup Manager which is then referred to by all application implementation scripts to track application implementation progress for that particular instance). In accordance with an embodiment, the project controller provides a ReRun parameter which can be appended with a base name for subsequent runs.

ReRun parameter Manager 242: In accordance with an embodiment, the ReRun parameter manager component identifies and ties the various setup entities together to form a new organization, and to generate and manage a unique rerun for every execution. In some instances the same script may need to be run multiple times on the same environment, or whenever a different/new organization is created which is uniquely identified by an associated ReRun parameter. Scripts can also be run on multiple environments at the same time; in such instances each environment has a specific ReRun parameter associated with it which is unique only in that particular environment. In accordance with an embodiment, the ReRun parameter manager achieves this by generating a unique ReRun parameter based on the generated rerun history for that environment, verifying that the generated ReRun parameter is unique for that particular environment by querying for the same, and archiving the history to be referred in case of subsequent rerun scenarios.

Automation Execution Manager 244: In accordance with an embodiment, the automation execution manager component is used to manage automation execution according to the defined scenario for execution, and current application instance data 245, including determining whether a test should be executed based on a current system condition 247 and/or whether an explicit login is required 248. In accordance with an embodiment, the automation execution manager can determine aspects of automation execution and make decisions accordingly, to build a list of tests and the order in which they are to be executed, including, e.g., execution control based on the Fusion Financials application runtime environment availability input; execution control based on products to be executed; execution control based on the project; and execution control based on the script type.

In accordance with an embodiment, the automation execution manager is also responsible for determining the order of tests to be executed based on predefined success criteria; the selection of specific object repository and the data sheet to be used with the test for particular execution; the login credentials to be used by the script; a tenant to be used for the particular execution; and whether an explicit login and logout is required for the automation regression test based on defined configuration.

As described above, in accordance with an embodiment, the RunSure Database 249 includes information that allows the RunSure controller to determine the exact data iteration up to the point at which a particular setup script has been executed in a particular application instance which is being implemented using the embodiment. This allows the script execution to be restarted from the exact point where setup effort was discontinued in the event of incomplete termination of script.

Figure 4:
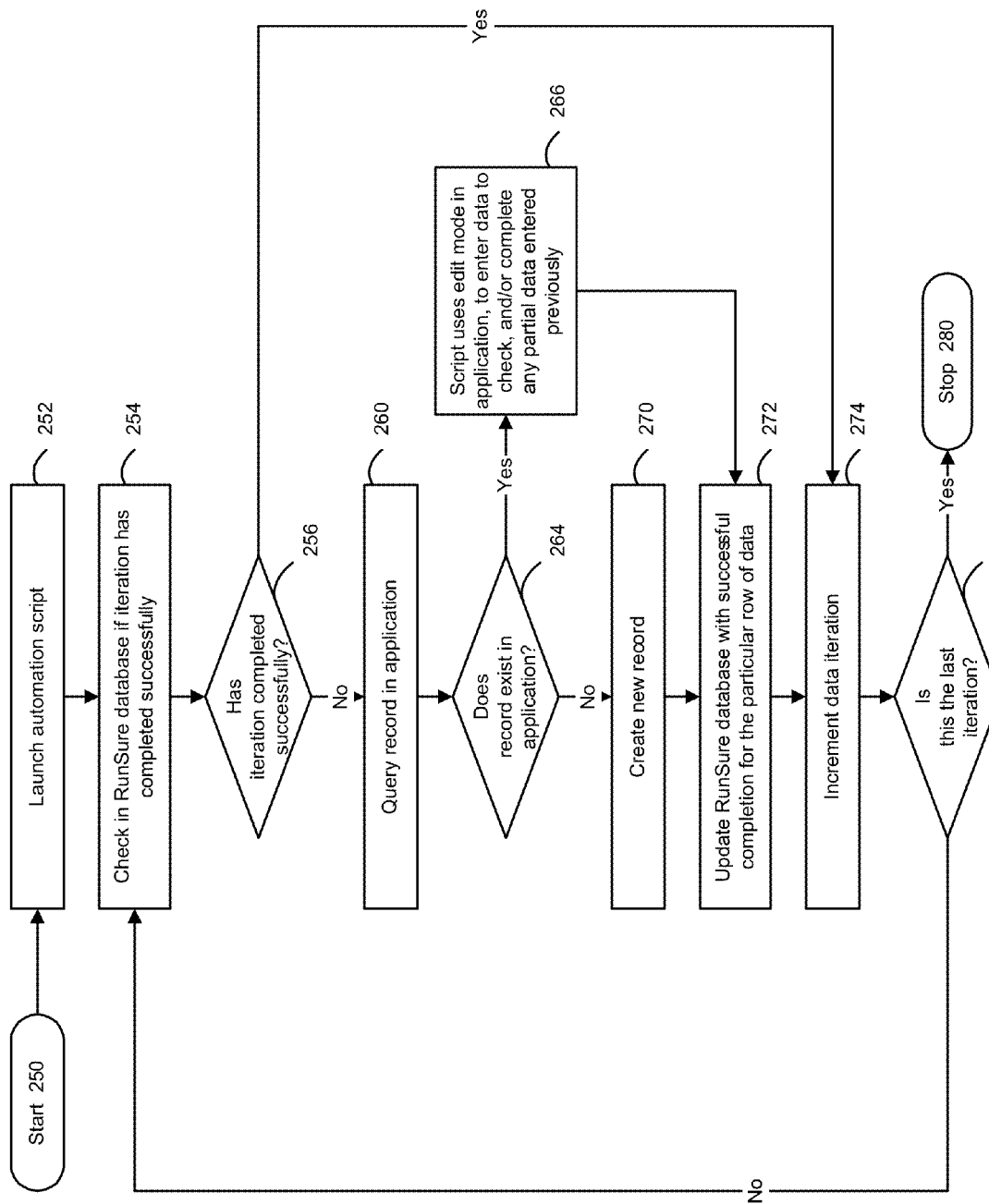
FIG. 4 illustrates a flowchart detailing the operation of a RunSure controller, in accordance with an embodiment.

FIG. 4 illustrates a flowchart depicting the operation of a RunSure controller, in accordance with an embodiment. As shown in FIG. 4, upon starting 250, at step 252 an application setup script begins execution. At step 254, the system checks the RunSure database to determine whether the current data iteration has been successfully entered in a previous run for the particular application instance. At step 256, if the iteration has completed successfully then, the data iteration is incremented if appropriate, and the process continues. If the data has not yet completed, or has not completed successfully then, at step 260, the RunSure controller directs the automation script to query for the exact data record in the application instance. If it is determined that a record in the application instance exists 264 then, at step 266, the script can be directed to provide an edit mode that allows application data to be verified and/or modified as per requirement. If no record exists then at step 270 a new record is created. At step 272, the RunSure database is updated to reflect the successful completion of the upgraded to the next data iteration that data iteration for the script being executed, with respect to particular application instance being implemented. At step 274, the data iteration is upgraded to the next data iteration. If at step 276, it is determined that this is not the last iteration, then the process repeats for the next iteration, otherwise the process stops 280.

Figure 5:
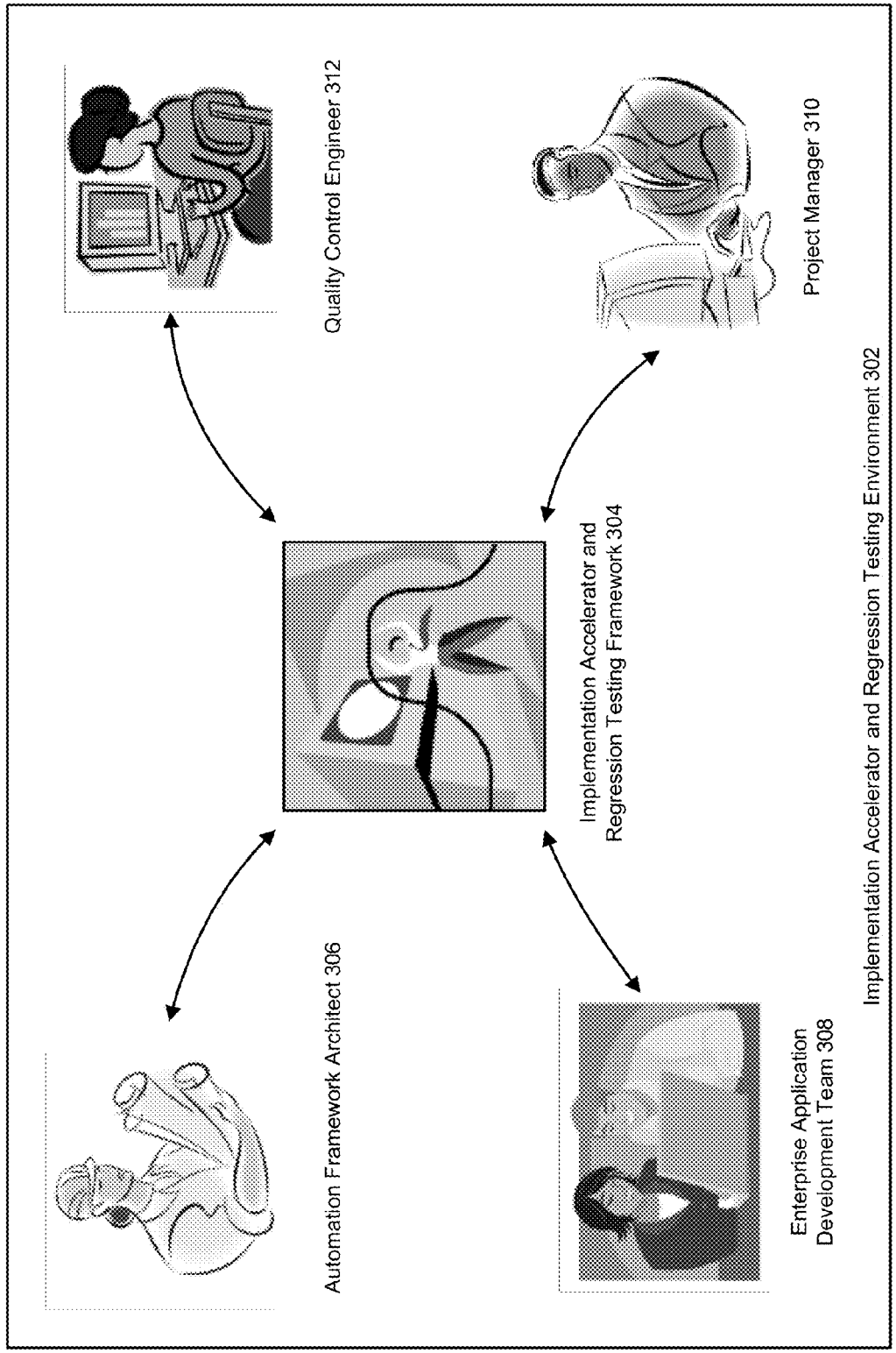
FIG. 5 illustrates an environment that can utilize an implementation accelerator and regression testing framework, along with various actors that may interact with it, in accordance with an embodiment.

FIG. 5 illustrates an environment 302 that can utilize automation framework for implementing and testing Fusion enterprise applications, in accordance with an embodiment, wherein the framework 304 is used by a plurality of actors, including, for example, an automation framework architect 306, an enterprise application development team 308 (e.g., a Fusion Financials development team), a project manager 310, and enterprise product quality assurance engineer 312. In accordance with an embodiment, the regression testing framework provides considerable advantages over previous approaches to regression testing, some examples of which are provided in Table 3.

TABLE 3

| Actor | Limitations of Previous Approach | Advantages of Regression Testing Framework |
| --- | --- | --- |
| Regression Test Automation Framework Architect | No predefined scalable architecture which could be added on to in case of enhanced requirements or changed application testing needs without major overhaul of the entire structure. | Regression testing framework provides a dedicated and structured automation framework which is scalable; including services and controls which can be used across scripts; provides flexibility to add new controls and services as per changes in application implementation or testing requirements without changing the basic architecture. (central execution controller) |
| Quality Control Engineer | Development of integrated mutually synchronized Fusion Financials application setup scripts was not supported previously. Also in the previous scheme of things, regression test scripts were developed as standalone tests making it time consuming and tedious job which was not based on any particular format. | Complexity is reduced since dedicated centralized modules are available which can be plugged into scripts to suffice common needs (central function library). This contributes to a standard based script development approach enhancing the efficiency of the script development process as a whole. |
|  | Execution failures were difficult to triage. | Execution failures are much simpler to triage due to availability of screen shots of the exact point of failure in the result file. (exception handler mechanism) |
|  | Determining the rows of data to be re executed was a time consuming and tedious process. | Re execution in case of partial or no data entry becomes a simple process. (RunSure component) |
|  | Any change in execution requirements demand significant reconfiguring at automation scripts level | Execution needs can be easily reconfigured. (external XML and central execution controller) |

TABLE 3-continued

| Actor | Limitations of Previous Approach | Advantages of Regression Testing Framework |
| --- | --- | --- |
| | Significant rework at automation script level required in case of setup/test data change or in case of any changes in the enterprise application business process | Minor or no rework of script may be required in case of test/setup data change, since the data is separated from the script; also with the introduction of Rerun parameter multiple reruns can be carried out within the same environment without requiring any manual intervention. |
| Enterprise Application Development Team knowledge transfer | Required to provide detailed sessions to quality assurance engineers on demand and in unorganized fashion, which causes significant duplication of knowledge transfer effort. Most of environment preparatory work carried out manually due to lack of flexibility with respect to application implementation task of automation regression test with respect to data. | Knowledge transfer to QA engineer required only once per task, since the tasks can then be reused in different automation scripts. modular architecture (central function library) Automated scripts can handle all application implementation related tasks automatically. This is enabled by multiple services and components offered by the automation framework. Flexibility of data is provided by runtime pairing of script with appropriate data. (external data sheets) |
| Project Manager | Significantly higher development time of automation script and hence the project time also increased; higher risks and estimation more difficult due to unavailability of standard approach for each task. | Risks and development time are reduced, also estimation is lot easier due to availability of standard components for each task. (central function library) |
| | Unable to ensure parallel execution of projects using the same automation scripts but on a different environment | Same automation scripts can be executed on different application versions and application instances as a part of different projects in parallel. (external object repository, external XML and central execution control) |
| | Unable to ensure parallel execution of projects using different data | Same automation scripts can be executed as a part of different projects with different data in parallel. (external object repository, external data sheet, external XML and central execution control) |
| | Unable to carry out multiple simultaneous executions of automation regression tests on the same environment | Simultaneous multiple executions supported on the same environment. (ReRun mechanism, central execution controller, central XML) |
| | Automation execution projects have very low efficiency levels | Efficiency for automation execution projects rises significantly due to system resources being freed as soon as the first failure is detected. (central exception handler) |

Figure 6:
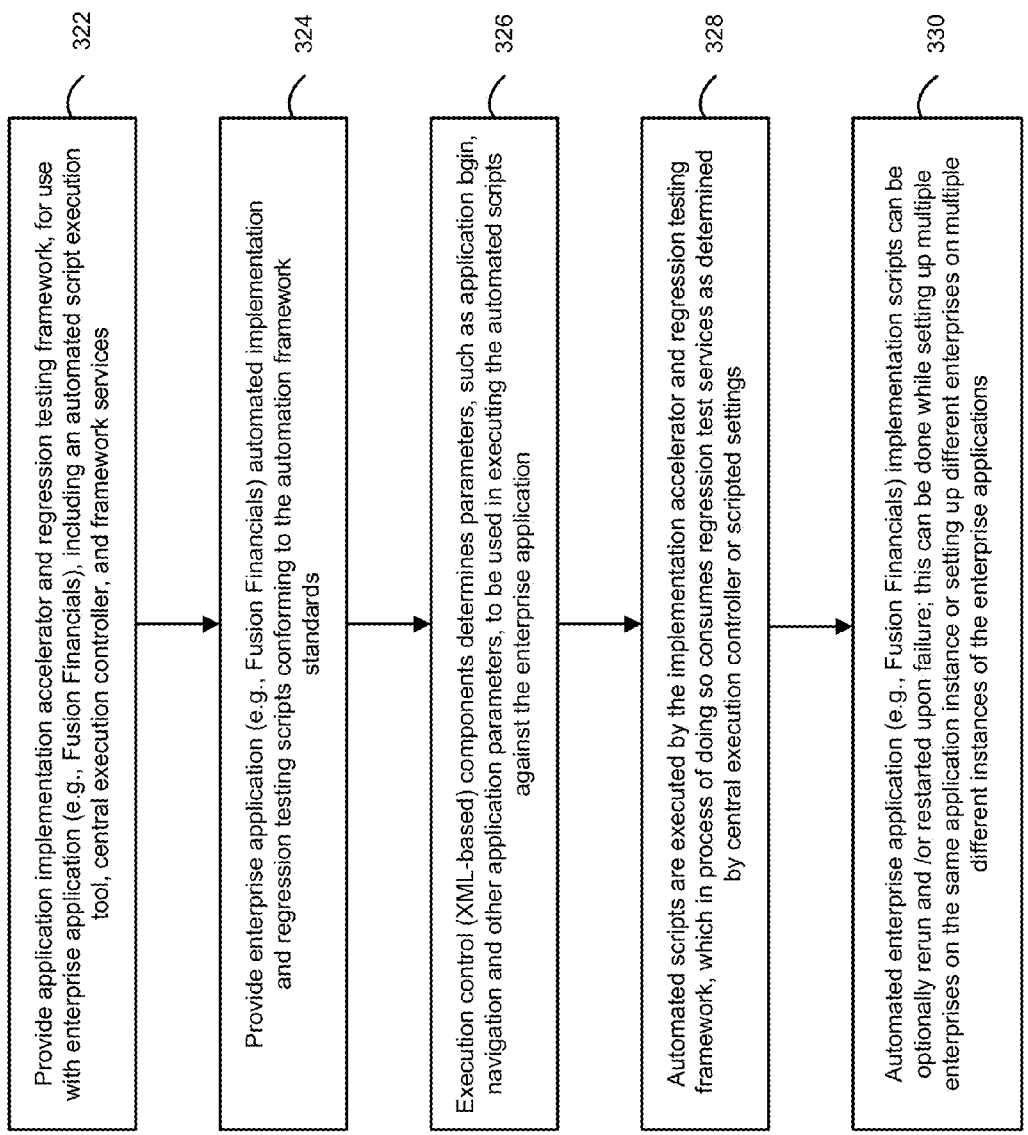
FIG. 6 illustrates a method for providing an automated implementation and regression testing framework for use with enterprise applications, in accordance with an embodiment.
Figure 6:
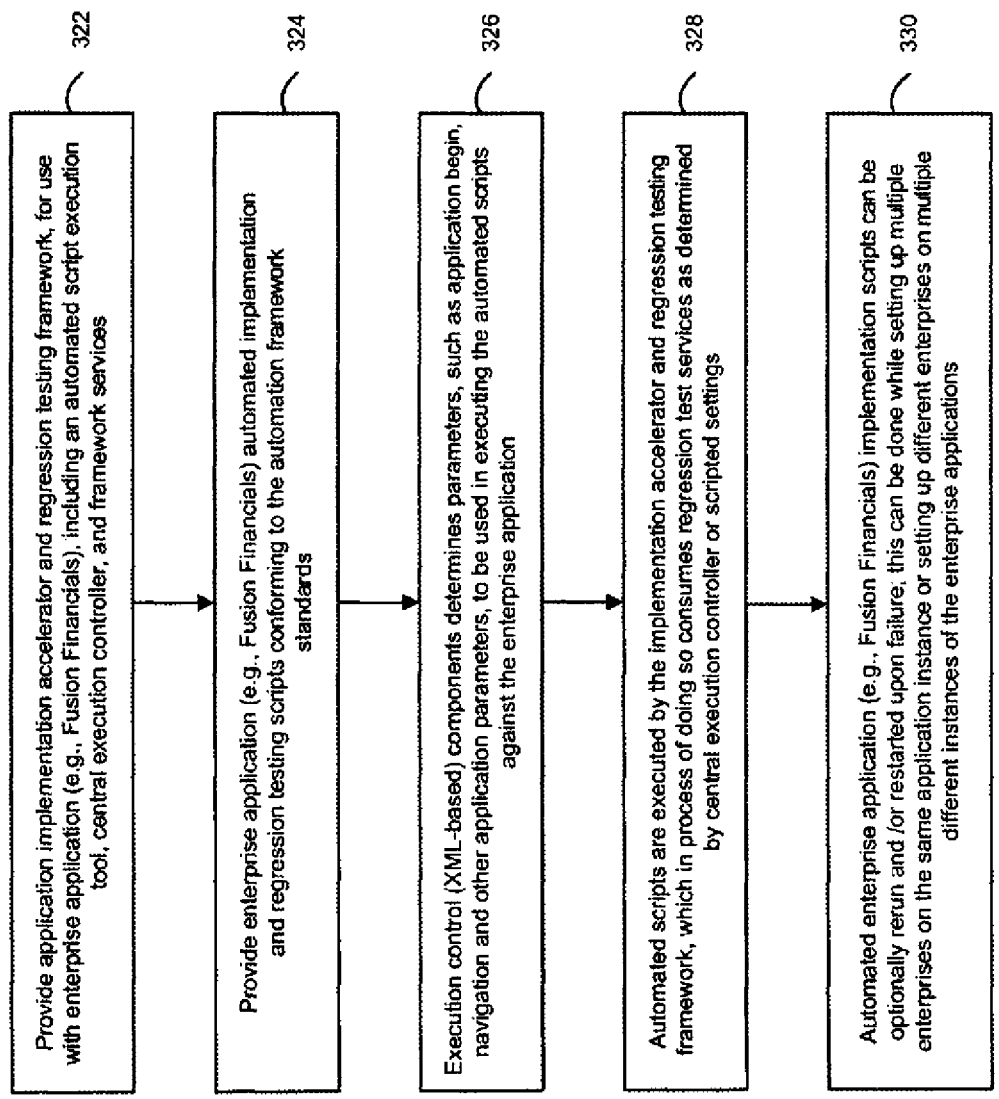

FIG. 6 illustrates a method for providing an automation framework for use with enterprise applications, in accordance with an embodiment. As shown in FIG. 6, at step 322, an application implementation accelerator and regression testing framework can be provided, for use with an enterprise application (e.g., Fusion Financials), and including a central execution controller, and one or more automation services. The automation framework also provides an integrated automation tool that may be used by a user to design, develop and/or maintain automated scripts for use with automation framework. At step 324, multiple Fusion Financials applications automated implementation and regression testing scripts conforming to the automation framework standards are provided. These are used to setup and test various aspects of the Fusion Financials application. At step 326, an execution control (XML-based) component determines parameters, such as application login, navigation and other application parameters, to be used in executing the automated scripts against enterprise application. At step 328, an automated script is executed using the automation framework. It consumes various services and utilizes various components offered by the automation framework. The decision to do so is based on script and central execution controller settings. At step 330, the result set for the particular execution is compiled. At this stage automated Fusion Financials application implementation scripts can be optionally rerun and/or restarted upon failure. This can be done while setting up multiple enterprises on the same application instance or setting up different enterprises on multiple different instances of Fusion Financials applications.

Parallel Execution Using Multiple Computers and/or Multiple Application Environments In accordance with an embodiment, the regression testing framework can be configured to run on multiple computers or machines, and/or can support multiple application environments, and/or parallel execution of scripts running thereon. This can be facilitated using one or more of the features described above, including:

Use of XML driven login Information means that login information can be separated from the individual scripts and fed directly through an execution control XML file. In accordance with an embodiment, this XML can be then parsed at runtime and in-built processing logic is assembled by the automation controller and login script accordingly. This allows passing login information to individual scripts and allows execution on multiple environments, on multiple machines simultaneously;

Separation of login script allows ease of maintenance and control with respect to environment settings i.e., prerequisites for "Setup based test" login might be different from the "Transactional test" login. In accordance with an embodiment, such functionality can be handled by login script in accordance to information passed on by execution control XML. Maintaining login separate also enables ease of maintenance by reducing the number of affected scripts in case of any login action change. This, in collaboration with the login control XML, allows the same script to login to multiple environments in multiple types in a multi environment and multi machine setting;

Separation of object repository from the individual scripts allows runtime pairing of object definitions and scripts. This ensures that the objects are recognized by the script on the environment they are being executed on. An earlier build (e.g., an earlier version of Oracle Fusion Financials) may have different object definitions compared to a newer build (e.g., a newer version of Oracle Fusion Financials) but the object definition is paired with the test at runtime and this ensures that correct object definitions are loaded for the test being executed. In accordance with an embodiment, this ensures that the same test can be run on multiple environments on multiple machines without any test level modifications;

Separation of data, and pairing of data with the script at runtime allows flexibility in terms of setup data. This feature ensures that data specific to the environment being implemented can be run without test level modifications. In accordance with an embodiment, this allows the same test to be run on multiple machines and multiple environments with distinct data specific to each environment;

Separation of navigation controller, allows navigation to functional task navigation within Fusion Financials applications become a centralized task. Once the browser is launched by the login script in association with XML file the navigation controller takes over. This centralized approach also enables ease of maintenances in case of task location change or navigation process change in subsequent release of application. In accordance with an embodiment, this component is tasked to ensure that appropriate functional area is navigated to before the automated script takes over. This is a parameter driven entity and is independent of the environment and machine on which the test is being run hence multiple instance of same or different environments can be launched on the multiple machines;

The automated script is first, in that the functional test script is loaded in the memory of the system and this copy is then executed. In accordance with an embodiment, environment setups can be tied to each other through a common ReRun parameter for that particular environment. This ensures consistency of the organization being setup (functional setup) for the particular environment irrespective of the machine on which the test is run. In case of setups, each entity is checked for existence before creation preventing unnecessary duplications, corruption of data or failure of subsequent scripts. In accordance with an embodiment, transactional scripts can be synchronized with last good configuration completed on the particular instance using the same re-run parameter. These can also be appended with a unique automation framework generated transaction id for each transaction. This ensures that there is no locking of the scripts in event of simultaneous multiple environment executions of the script on different machines, and also assists in maintaining synchronization between setups for a particular environment instance being executed on a multi machine model, and ensuring that any number of transactions can be conducted for a particular environment instance using multiple machines on the last known good configuration for that instance.

Use of Automation Execution Controller to determine the ReRun parameter that is appended to each functional entity when preparing a new environment (or) in case of creation of a separate functional entity on the same environment for testing purposes. In accordance with an embodiment, this is maintained centrally for each instance and is incremented automatically only after the successful execution of the last setup script. Once a ReRun number is consumed this is saved and later referred to in case of generation of subsequent numbers in the series for the particular environment. This ensures that the environment setups are always in a synchronized state for that particular environment instance, irrespective of the machine the particular setups is being executed on. In accordance with an embodiment, provisions can be made for overriding the rerun manually, through the use of the environment control XML, in case of special circumstances.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Although some of the described embodiments describe the Fusion Financials Implementation Accelerator and Regression Testing Framework features in the context of Oracle Fusion Applications and Fusion Financials, the described framework and features can also be used in the context of other enterprise application environments. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing an automated implementation accelerator and regression testing framework for use with enterprise applications, comprising:
    a computer including a microprocessor;
    a plurality of automation framework services and components, which can be consumed by automated scripts during implementation and subsequent testing of an enterprise application;
    an automated script, which can be executed by the automation framework and consume the automation framework services and components provided thereby, to test the enterprise application; and
    a central execution controller, which controls the implementation and subsequent testing of the enterprise application by monitoring execution of the automated scripts based on a programmed instruction script and other settings, and consolidating and presenting a result for the automation tasks executed by it, for reference and progress tracking; and
    a rerun parameter controller, on the central execution controller, that identifies and ties a plurality of environment setup entities together for a particular environment using a common rerun parameter;
    wherein the common rerun parameter is used to check for an existence of each environment entity for the particular environment, so that an environment setup is consistent for each environment when the automated scripts are configured to run in a plurality of environments at the same time.

2. The system of claim 1, wherein a decision to consume services can be based either on the central execution controller settings, or at the script level.

3. The system of claim 1, further comprising an execution control configuration provided as an XML or similar configuration component that determines parameters to be used for the execution of automated scripts.

4. The system of claim 1, wherein the rerun parameter controller ensures that every setup data iteration for a setup script run for a particular application instance succeeds, and if necessary determines a particular setup data iteration where that script has stopped, so that the setup data iteration can be restarted from the stopping point.

5. The system of claim 1, wherein the rerun parameter controller further operates to automate a process from a product quality assurance perspective ensuring minimum human intervention is required to set up multiple different organizations, synchronize various setup tasks while setting up a new organization instance, and collect prior run history for an environment and refer to the run history when setting up a new organization instance in the application.

6. A method for providing a regression testing framework for use with enterprise applications, comprising:
    providing, at a computer including a microprocessor, a plurality of automation framework services and components which can be consumed by automated scripts during implementation and subsequent testing of an enterprise application;
    executing an automated script, which can consume automation services and components provided thereby, to implement and subsequently verify configuration of Fusion Financials Enterprise application; and
    controlling the implementation and testing of the enterprise application as directed by the automated script using the automation services and components, and providing a results of the tasks executed;
    wherein a rerun parameter controller is configured to identify and tie a plurality of environment setup entities together for a particular environment using a common rerun parameter; and
    wherein the common rerun parameter is used to check for an existence of each environment entity for the particular environment, so that an environment setup is consistent for each environment when the automated script is configured to run in a plurality of environments at the same time.

7. The method of claim 6, wherein a decision to consume services can be based either on the central execution controller settings, or at the script level.

8. The method of claim 6, further comprising using an execution control configuration provided as an XML or similar configuration component to determine parameters to be used for the execution of the script.

9. The method of claim 6, wherein the rerun parameter controller ensures that every setup data iteration for a setup script run for a particular application instance succeeds, and if necessary determines a particular setup data iteration at which the setup script may have stopped, so that the setup data iteration can be restarted from the stopping point.

10. The method of claim 6, wherein the rerun parameter controller further operates to automate a process from a product quality assurance perspective ensuring minimum human intervention is required to set up multiple different organizations, synchronize various setup tasks while setting up a new organization instance, and collect prior run history for an environment and refer to the run history when setting up a new organization instance in the application.

11. A non-transitory computer readable storage medium, including instructions stored thereon which when read and executed by one or more computers cause the one or more computers to perform the steps comprising:
    providing, at a computer including a microprocessor, a plurality of automation framework which can be consumed by automated implementation and testing of Fusion Financials of an enterprise application;
    executing an automated script regression test, which can consume automation framework services provided thereby, implement and subsequently test Fusion Financials to enterprise application; and
    controlling the implementation and testing of the enterprise application as directed by the automated script using automation framework services and components, and providing a results of the testing,
    wherein a rerun parameter controller is configured to identify and tie a plurality of environment setup entities together for a particular environment using a common rerun parameter; and
    wherein the common rerun parameter is used to check for an existence of each environment entity for the particular environment, so that an environment setup is consistent for each environment when the automated script is configured to run in a plurality of environments at the same time.

12. The non-transitory computer readable storage medium of claim 11, wherein a decision to consume services can be based either on the central execution controller settings, or at the script level.

13. The non-transitory computer readable storage medium of claim 11, further comprising using an execution control configuration provided as an XML or similar configuration component to determine parameters to be used for the execution of the script.

14. The non-transitory computer readable storage medium of claim 11, wherein the rerun parameter controller ensures that every setup data iteration for a setup script run for a particular application instance succeeds, and if necessary determines a particular setup data iteration at which the setup script may have stopped, so that the setup data iteration can be restarted from the stopping point.

15. The non-transitory computer readable storage medium of claim 11, wherein the rerun parameter controller further operates to automate a process from a product quality assurance perspective ensuring minimum human intervention is required to set up multiple different organizations, synchronize various setup tasks while setting up a new organization instance, and collect prior run history for an environment and refer to the run history when setting up a new organization instance in the application.

* * * * *

UNITED STATES PATENT AND TRADEMARK OFFICE
CERTIFICATE OF CORRECTION

Page 1 of 2

PATENT NO. : 8,850,400 B2
APPLICATION NO. : 13/626710
DATED : September 30, 2014
INVENTOR(S) : Shrivastava et al.

It is certified that error appears in the above-identified patent and that said Letters Patent is hereby corrected as shown below:

On the title page, in the illustrative figure, under Reference Numeral 326, line 1, delete "bgin," and insert -- begin, --.

In the Drawings

On sheet 2 of 6, in figure 2, under Reference Numeral 203, line 1, delete "Enteprise" and insert -- Enterprise --, therefor.

On sheet 6 of 6, in figure 6, under Reference Numeral 326, line 1, delete "bgin," and insert -- begin, --, therefor. (See Attached)

In the Specification

In column 2, line 20, delete "actors" and insert -- factors --, therefor.

In column 10, line 26, delete "actors," and insert -- factors, --, therefor.

Signed and Sealed this
Ninth Day of February, 2016

Michelle K. Lee
*Director of the United States Patent and Trademark Office*